(12) United States Patent
Du et al.

(10) Patent No.: US 10,533,310 B2
(45) Date of Patent: Jan. 14, 2020

(54) FLUSHOMETER VALVE TO OUTLET TUBE COUPLING

(71) Applicant: Masco Canada Limited, St. Thomas (CA)

(72) Inventors: Xan Vy Du, London (CA); Frank Stauder, London (CA); Bryan Fisher, Appin (CA); Derek Bernyk, Appin (CA)

(73) Assignee: MASCO CANADA LIMITED, St. Thomas (CA)

( * ) Notice: Subject to any disclaimer, the term of this patent is extended or adjusted under 35 U.S.C. 154(b) by 0 days.

(21) Appl. No.: 15/661,223

(22) Filed: Jul. 27, 2017

(65) Prior Publication Data
US 2018/0030708 A1 Feb. 1, 2018

Related U.S. Application Data

(60) Provisional application No. 62/367,682, filed on Jul. 28, 2016.

(51) Int. Cl.
| | | |
|---|---|---|
| *E03D 3/02* | (2006.01) | |
| *F16K 27/00* | (2006.01) | |
| *E03C 1/10* | (2006.01) | |

(52) U.S. Cl.
CPC .............. *E03D 3/02* (2013.01); *F16K 27/00* (2013.01); *E03C 1/102* (2013.01); *Y10T 137/3149* (2015.04)

(58) Field of Classification Search
CPC . E03D 3/02; E03C 1/102; F16K 27/00; Y10T 137/3149
See application file for complete search history.

(56) References Cited

U.S. PATENT DOCUMENTS

| | | | |
|---|---|---|---|
| 2,148,968 A | | 2/1939 | Shanley |
| 2,202,099 A | | 5/1940 | Gillen |
| 3,645,311 A | | 2/1972 | Tinnerman |
| 3,797,515 A | | 3/1974 | Buhler |
| 4,499,616 A | * | 2/1985 | Johnson .................... E03D 1/34 4/393 |
| 4,712,575 A | * | 12/1987 | Lair ........................ E03C 1/108 137/218 |
| 4,777,669 A | | 10/1988 | Rogus |
| 5,542,718 A | | 8/1996 | Gronwick et al. |
| 5,564,460 A | | 10/1996 | Gronwick et al. |
| 6,119,713 A | * | 9/2000 | Pino .......................... E03D 3/06 137/218 |
| 6,659,511 B2 | * | 12/2003 | Yoneyama ............... F16L 25/12 285/302 |
| 6,923,426 B1 | | 8/2005 | Pino |
| 7,980,528 B2 | | 7/2011 | Wilson |
| 9,127,778 B2 | | 9/2015 | Stauder et al. |
| 2004/0111793 A1 | | 6/2004 | Sutherland et al. |
| 2005/0121912 A1 | * | 6/2005 | Benscoter ............. F16L 37/113 285/401 |
| 2008/0078969 A1 | * | 4/2008 | Snyder ...................... E03D 3/02 251/129.03 |

* cited by examiner

*Primary Examiner* — Eric Keasel
*Assistant Examiner* — Kevin R Barss
(74) *Attorney, Agent, or Firm* — Reising Ethington P.C.

(57) ABSTRACT

A flushometer valve assembly comprises a flushometer valve body including an outlet, an outlet tube including a conduit extending along a longitudinal axis, and a flushometer valve tube-to-body coupling that directly fastens the outlet tube to the flushometer valve body.

20 Claims, 7 Drawing Sheets

FLUSHOMETER VALVE TO OUTLET TUBE COUPLING

TECHNICAL FIELD

This disclosure relates generally to flushometer valves and, more particularly, to flushometer valve tube-to-body couplings.

BACKGROUND

Flushometer valves typically are used for plumbing fixtures like urinals and water closets. With reference to FIG. A, a flushometer valve assembly 10 usually includes a flushometer valve body 12, an outlet tube 14, and a coupling nut 13 securing the outlet tube 14 to the flushometer valve body 12. In other words, the outlet tube 14 is indirectly fastened to the flushometer valve body 12 via the coupling nut 13. Conventionally, although not shown here, a coupling nut has two or more external wrench flats, external threads for coupling to corresponding internal threads of the body outlet, and a radially inwardly extending internal shoulder for cooperating with a flanged end of the outlet tube. The flushometer valve assembly 10 also typically includes an inlet pipe 16 coupled to a flushometer valve body inlet 18, an actuator 20 coupled to an actuator portion 22 of the flushometer valve body 12, and a cover 24 coupled to a top of the flushometer valve body 12. Although not shown, the flushometer valve assembly 10 also usually includes any other suitable attachments to the flushometer valve body 12, and any suitable valve(s), spring(s), seal(s), and/or the like in an interior of the valve body 12. In a conventional arrangement, an outlet tube includes one or more vent slots in a conduit of the tube just below a flanged end thereof, and a skirt is staked to a coupling nut to conceal vent slots from view but not impede proper operation of a vacuum breaker assembly located within the outlet tube. Vent slots are located so that they can either vent to atmosphere in a backflow condition or seal during normal operating conditions.

SUMMARY

A flushometer valve assembly comprises a flushometer valve body including an outlet, an outlet tube including a conduit extending along a longitudinal axis, and a flushometer valve tube-to-body coupling that directly fastens the outlet tube to the flushometer valve body.

BRIEF DESCRIPTION OF THE DRAWINGS

FIG. A is an elevational view according to a prior art flushometer valve assembly including a flushometer valve body, an outlet tube, and a flushometer valve tube-to-body coupling including a nut.

DETAILED DESCRIPTION

Figure 1:
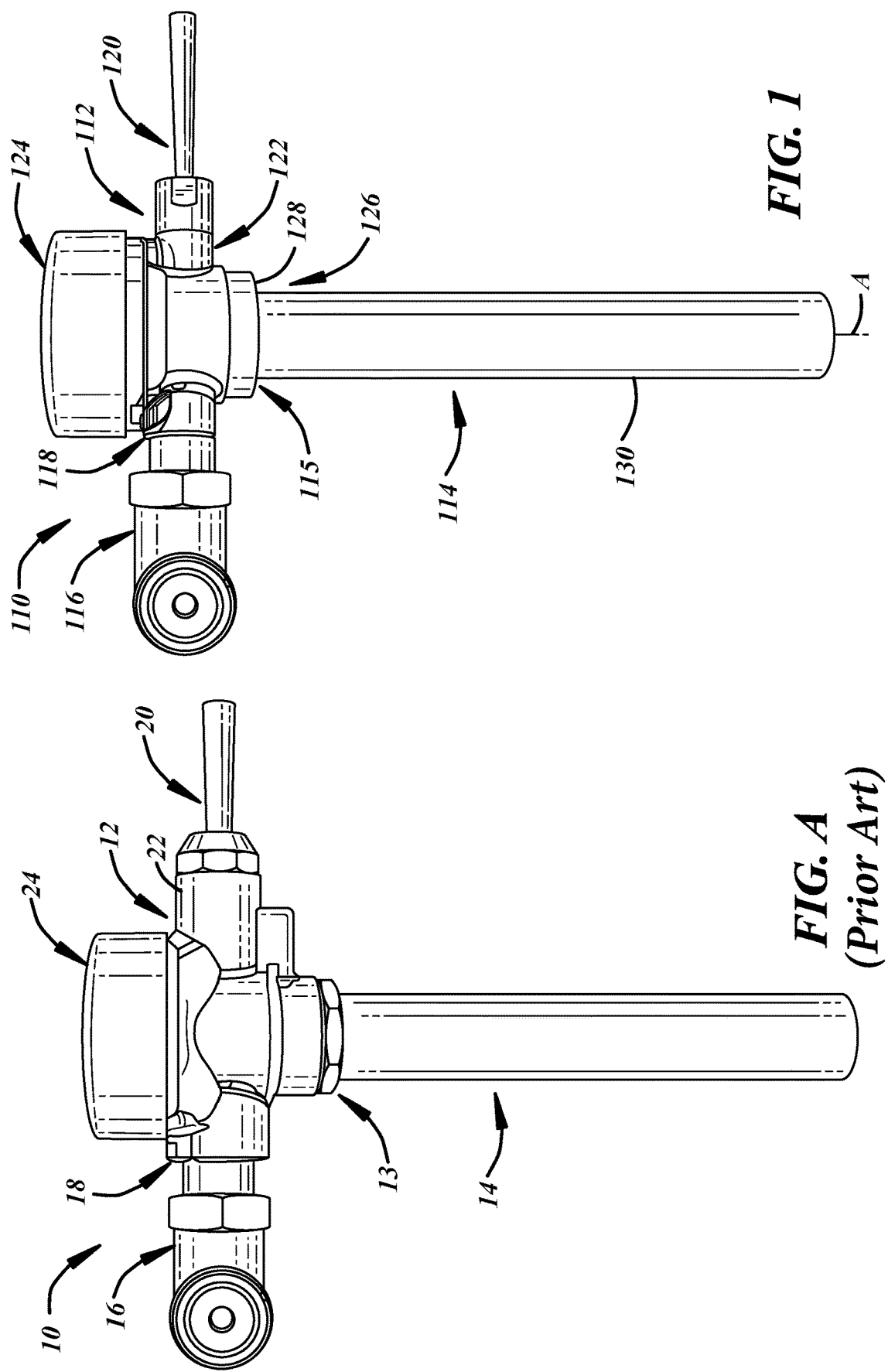
FIG. 1 is an elevational view according to an illustrative embodiment of a flushometer valve assembly including a flushometer valve body and an outlet tube in a nutless flushometer valve tube-to-body coupling arrangement.
Figure 2:
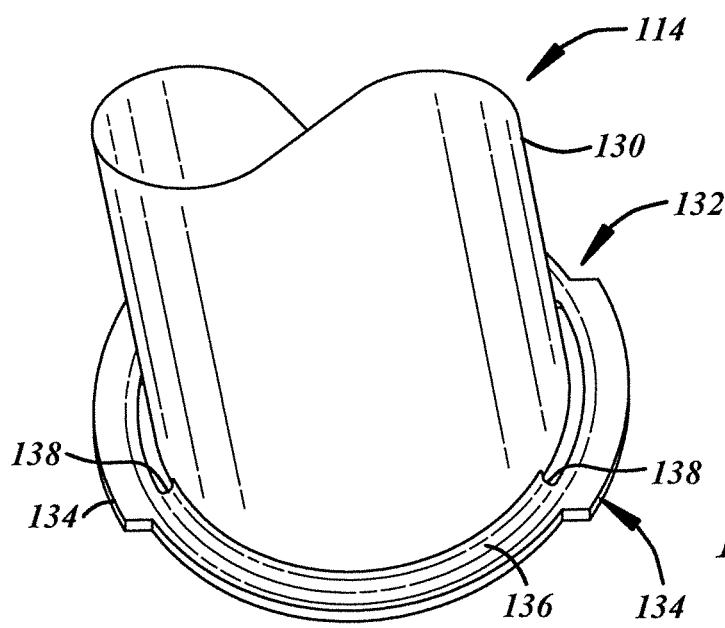
FIG. 2 is a fragmentary, upside-down, perspective view of the outlet tube of FIG. 1.
Figure 3:
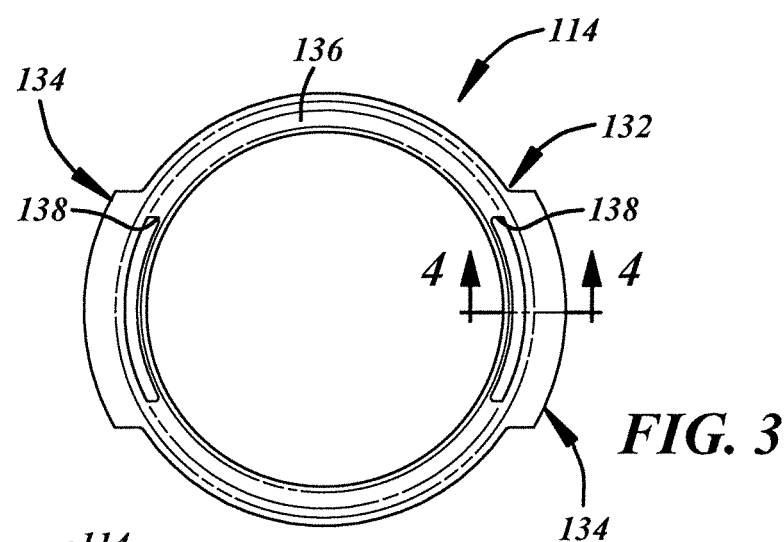
FIG. 3 is a top view of the outlet tube of FIG. 1.
Figure 4:
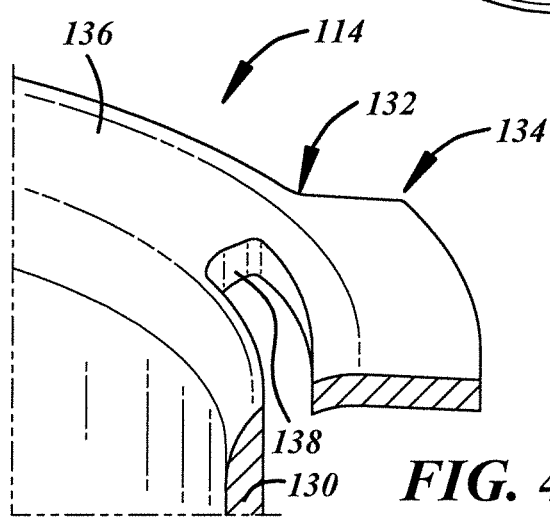
FIG. 4 is an enlarged, fragmentary, perspective sectional view of the outlet tube of FIG. 1, taken from FIG. 3.

Referring specifically to the drawings, FIGS. 1-3 show an illustrative embodiment of a flushometer valve assembly 110 including a flushometer valve body 112, an outlet tube 114, and a nutless flushometer valve tube-to-body coupling 115 that directly fastens the outlet tube 114 to the flushometer valve body 112. The flushometer valve assembly 110 also may include an inlet pipe 116 coupled to a flushometer valve body inlet 118, an actuator 120 coupled to an actuator portion 122 of the flushometer valve body 112, and a cover 124 coupled to a top of the flushometer valve body 112. Although not shown, the flushometer valve assembly 110 also may include any other suitable attachments to the flushometer valve body, and any suitable valve(s), spring(s), seal(s), and/or the like in an interior of the valve body 112 and, for instance, responsive to actuation of the actuator 120. Although shown as a manual actuator, the actuator 120 also or instead may include an electromechanical actuator or any other suitable actuator. The flushometer valve body 112 includes the inlet 118, an outlet 126 having an outlet tube coupler 128, and the actuator portion 122. The flushometer valve body 112 is of one-piece integral construction. The outlet tube 114 includes a conduit 130 extending along a longitudinal axis A and a flange 132 (FIG. 2) extending radially with respect to the conduit 130 for direct coupling to the outlet tube coupler 128 of the flushometer valve body outlet 126. The outlet tube 114 is of integral, one-piece construction such that the flange 132 and the conduit 130 are manufactured as a single component.

With reference to FIGS. 2-5, the coupling 115 (FIG. 1) includes at least two lugs 134 circumferentially spaced apart from one another and projecting radially from the outlet tube flange 132 for direct coupling to the coupler 128 of the flushometer valve body 112. Also, the outlet tube 114 includes a transition portion 136 between the conduit 130 and the flange 132. The transition portion 136 may be radiused or curvate as shown, or may be angled, for instance at a 40-50 degree angle. One or more vent slots 138 may extend circumferentially and may have a circumferential extent that is less than a circumferential extent of a corresponding lug 134. In an embodiment, the vent slot(s) 138 may be provided in the conduit 130 near the flange 132 of the outlet tube 114. In another embodiment, as illustrated, the vent slot(s) 138 may be provided in only the transition portion 136 of the outlet tube 114.

Figure 5:
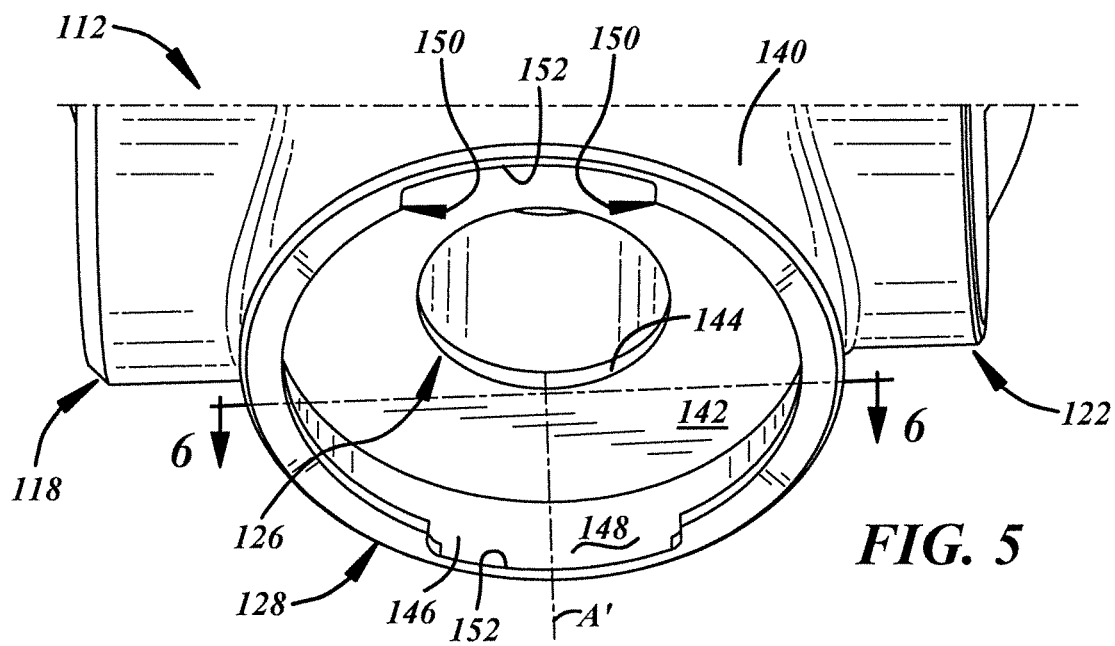
FIG. 5 is a fragmentary, lower perspective view of the flushometer valve body of FIG. 1.
Figure 6:
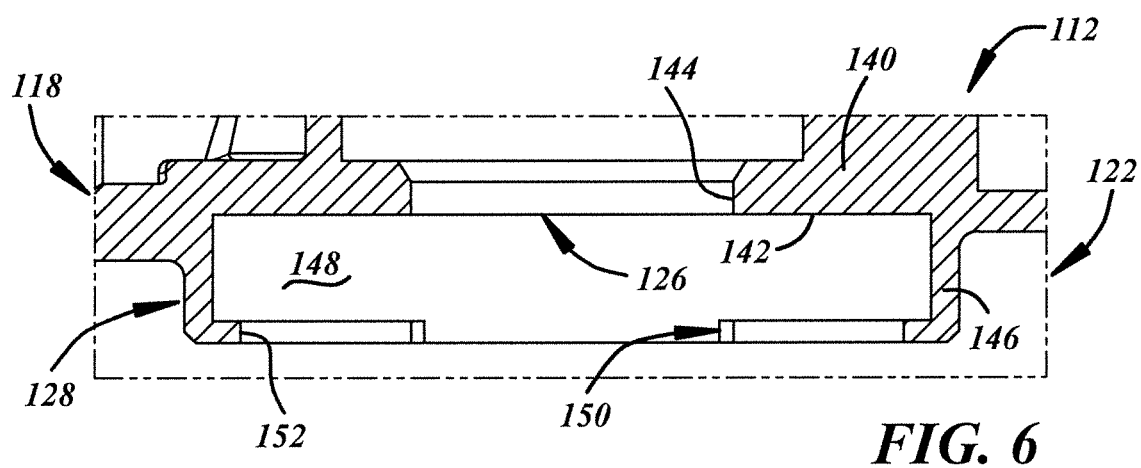
FIG. 6 is an enlarged, fragmentary, sectional view of the flushometer valve body of FIG. 1, taken from FIG. 5.

With reference to FIGS. 5 and 6, the flushometer valve body 112 may include a central portion 140 that may extend along a vertical longitudinal axis A' for housing various internal components of the flushometer valve, the inlet portion 118 extending transversely with respect to the central portion 140 for coupling to the inlet pipe (not shown), and the actuator portion 122 extending transversely with respect to the central portion 140 for coupling to the actuator (not shown). The central portion 140 may include a base wall 142 with an aperture 144 therethrough to establish the outlet 126, and a circumferentially continuous skirt 146 depending downwardly from the base wall 142 and at least partially establishing a tube flange pocket 148 for accepting the flange 132 of the outlet tube 114 (FIG. 2). The coupler 128 of the flushometer valve body 112 includes at least two flanges 150 circumferentially spaced apart from one another by at least two corresponding lug reliefs 152 and projecting radially inwardly from the skirt 146, for instance, from a lower portion of the skirt 146, for direct coupling to the outlet tube 114 (FIG. 2). The pocket 148 may be produced, for instance, by a machined undercut operation, for example, via a trepanning operation and tooling.

Figure 7:
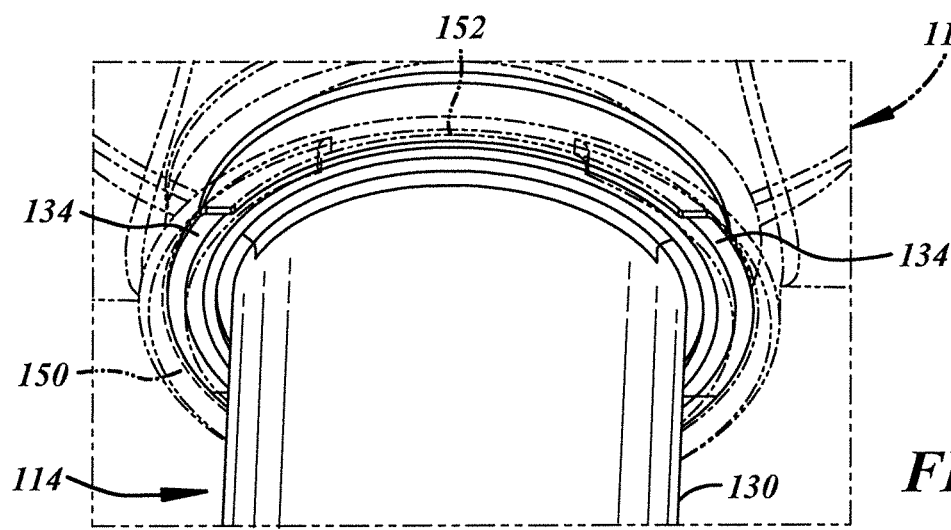
FIG. 7 is a fragmentary, lower perspective view of the coupling of FIG. 1.

With reference to FIG. 7, the outlet tube 114 may be assembled to the valve body 112. The tube lugs 134 may be passed between the body flanges 150 through the reliefs 152 and then rotated relative thereto such that the lugs 134 and the flanges 150 overlap to retain the tube 114 to the body 112.

Figure 8:
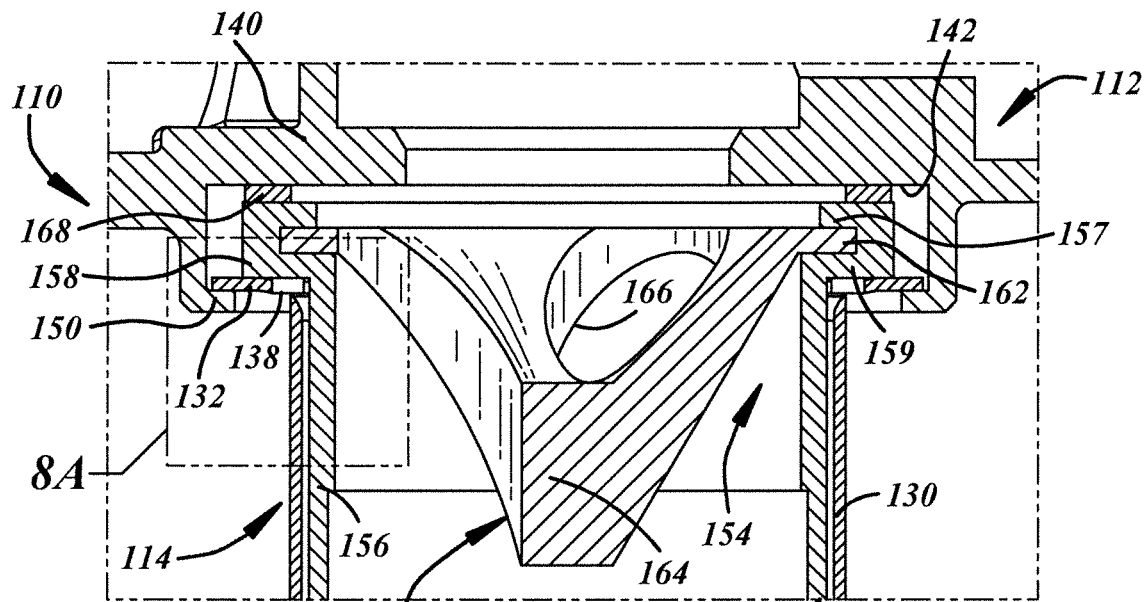
FIG. 8 is a fragmentary, cross-sectional view of the coupling of FIG. 1, taken from FIG. 7.

With reference to FIG. 8, before assembly, a packing material, seal(s), or the like may be inserted between the outlet tube flange 132 and the valve body 112. For example, a vacuum breaker assembly 154 may be carried by the flanged end of the outlet tube 114. The vacuum breaker assembly 154 may be T-shaped, and may include a sleeve 155 including a tubular portion or conduit 156 extending downwardly into the outlet tube 114, and an enlarged head portion 158 trapped between the flange 134 of the tube 114 and the base wall 142 of the central portion of the valve body 112. Also, a funnel 160 may be carried by the sleeve 155, and may include a flanged portion 162 trapped in a recess of the enlarged head portion 158 by spaced apart upper and lower horizontal flanges 157, 159 of the enlarged head portion 158 of the sleeve 155 and a central portion 164 having one or more apertures 166 extending downwardly into the sleeve 155. Also, or instead, a slip ring or gasket, or other type of seal 168 may be carried between the flange 132 of the tube 114 and the base wall 142 of the central portion of the valve body 112. More particularly, in the illustrated embodiment, the seal 168 may be carried between the enlarged head 158 of the sleeve 155 and the base wall 142 of the valve body 112.

Figure 8A:
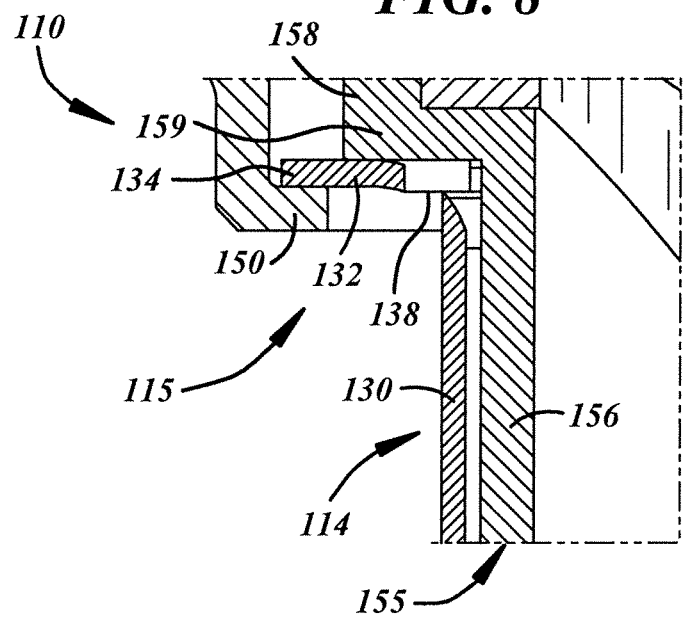
FIG. 8A is an enlarged, fragmentary, cross-sectional view of the coupling of FIG. 1, taken from FIG. 8.

With reference to FIG. 8A, an atmospheric path may be provided through the coupling 115 of the assembly 110. For example, a radial clearance may be provided between an external surface of the tubular portion 156 of the vacuum breaker sleeve 155 and a corresponding internal surface of the conduit 130 of the outlet tube 114. Also, the radial clearance is in open communication with the vent(s) of the outlet tube 144, and the lower flange 159 of the enlarged head portion 158 of the sleeve 155 is in contact with the flange 132 of the outlet tube 114 to overlie the vent(s) 138. Finally, the vent(s) 138 are in open communication with a radial space between an external surface of the conduit 130 of the outlet tube 114 and radially inwardly facing surfaces of the flanges 150 of the valve body 112.

Figure 9:
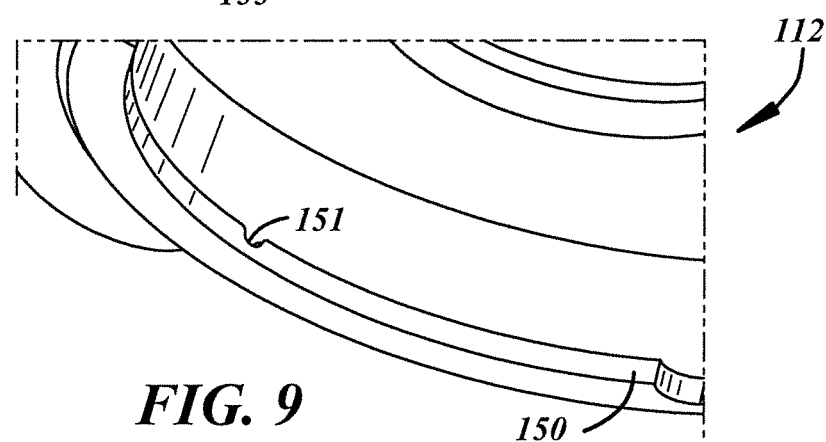
FIG. 9 is a further enlarged, fragmentary, perspective view of the flushometer valve body of FIG. 1.
Figure 10:
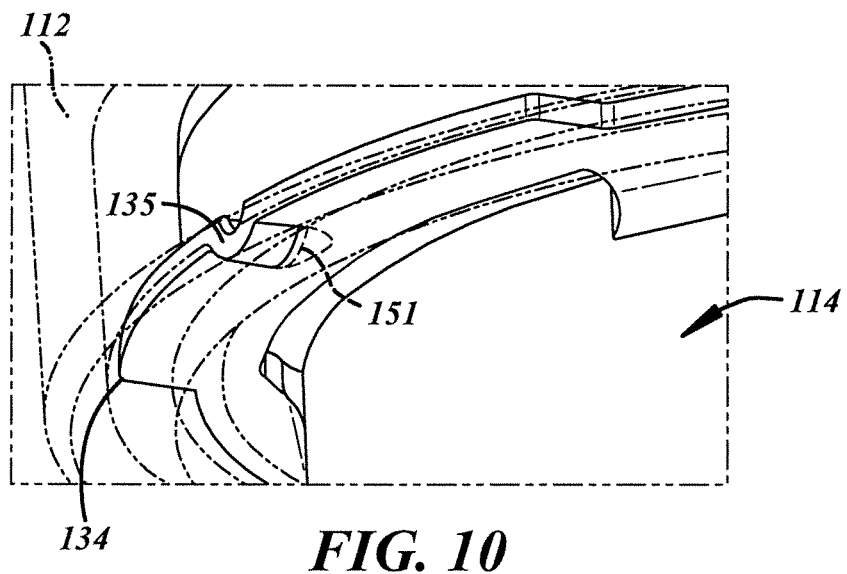
FIG. 10 is a further enlarged, fragmentary, perspective view of the coupling of FIG. 1.

With reference to FIGS. 9 and 10, the outlet tube 114 may be circumferentially located or detented relative to the flushometer valve body 112. For instance, at least one of the flanges 150 of the body 112 may include a lug detent 151 and at least one of the lugs 134 may include a corresponding flange detent 135 for cooperating with the lug detent. As illustrated, the lug detent 151 may include a semi-circular divot in an axially upper surface of the flange 150. In other embodiments, the lug detent 151 may include a circumferential interruption in the flange 150, or may be of any other shape and/or configuration. Also, as illustrated, the flange detent 135 may include a semi-circular bend in the lug 134. In other embodiments, the flange detent 135 may include a triangular shaped bend, or may be of any other suitable shape and/or configuration. In other embodiments, the lug and flange detents 151, 135 may be reversed.

FIGS. 11-14 illustrate another illustrative embodiment of a flushometer valve body 212, outlet tube 214, and assembly 210. This embodiment is similar in many respects to the embodiment of FIGS. 1-10 and like numerals between the embodiments generally designate like or corresponding elements throughout the several views of the drawing figures. Accordingly, the descriptions of the embodiments are hereby incorporated into one another, and description of subject matter common to the embodiments generally may not be repeated.

Figure 11:
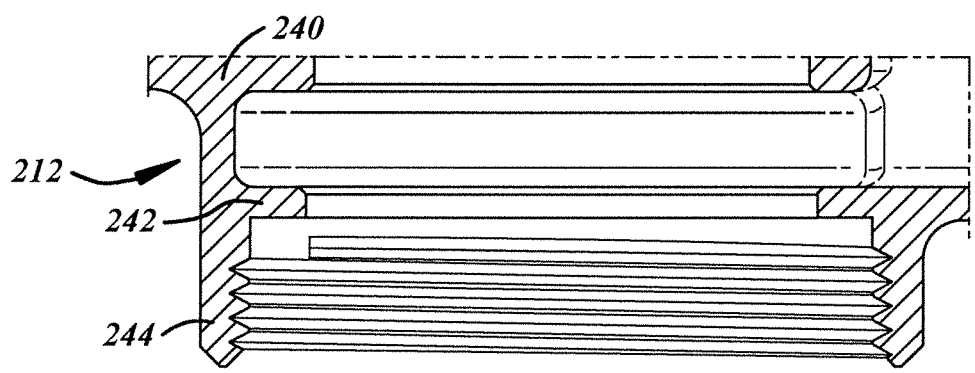
FIG. 11 is a fragmentary, sectional view of another illustrative embodiment of a body of a flush valve assembly.

With reference to FIG. 11, the valve body 212 may include a central portion 240 having a base wall 242, and a lower skirt 244 depending from the base wall 242 that is internally threaded, for instance, with one or more pipe threads.

Figure 12:
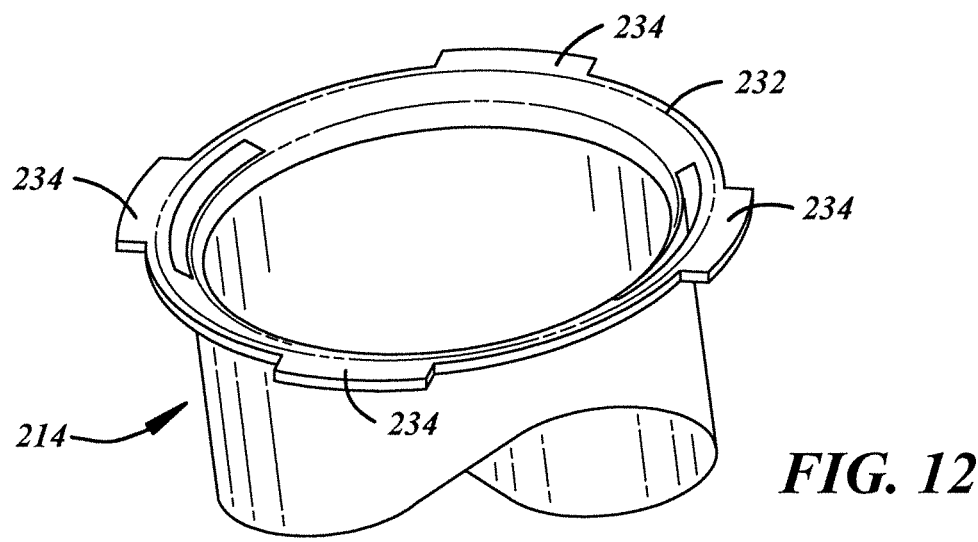
FIG. 12 is a fragmentary, perspective view of another illustrative embodiment of a flanged end of an outlet tube.

With reference to FIG. 12, the outlet tube 214 includes a flange 232 and two or more lugs 234 extending radially outwardly from the flange 232 and having helically shaped radially outer peripheries collectively establishing a thread for threadable cooperation with the internally threaded skirt 244 of the valve body 212.

Figure 13:
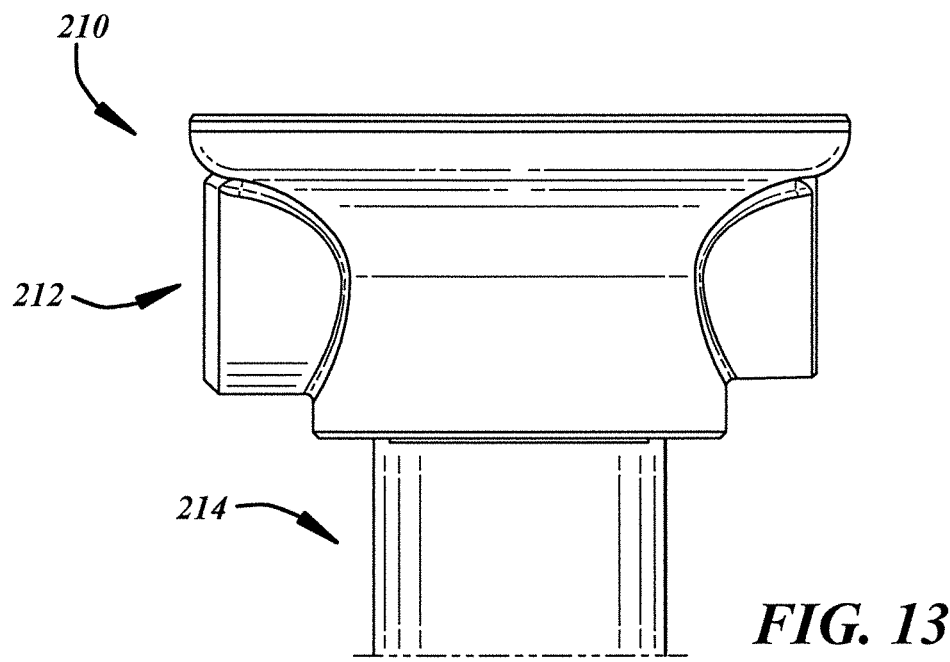
FIG. 13 is a fragmentary, elevational view of a flushometer valve assembly including the flushometer valve body of FIG. 11 and the outlet tube of FIG. 12.
Figure 14:
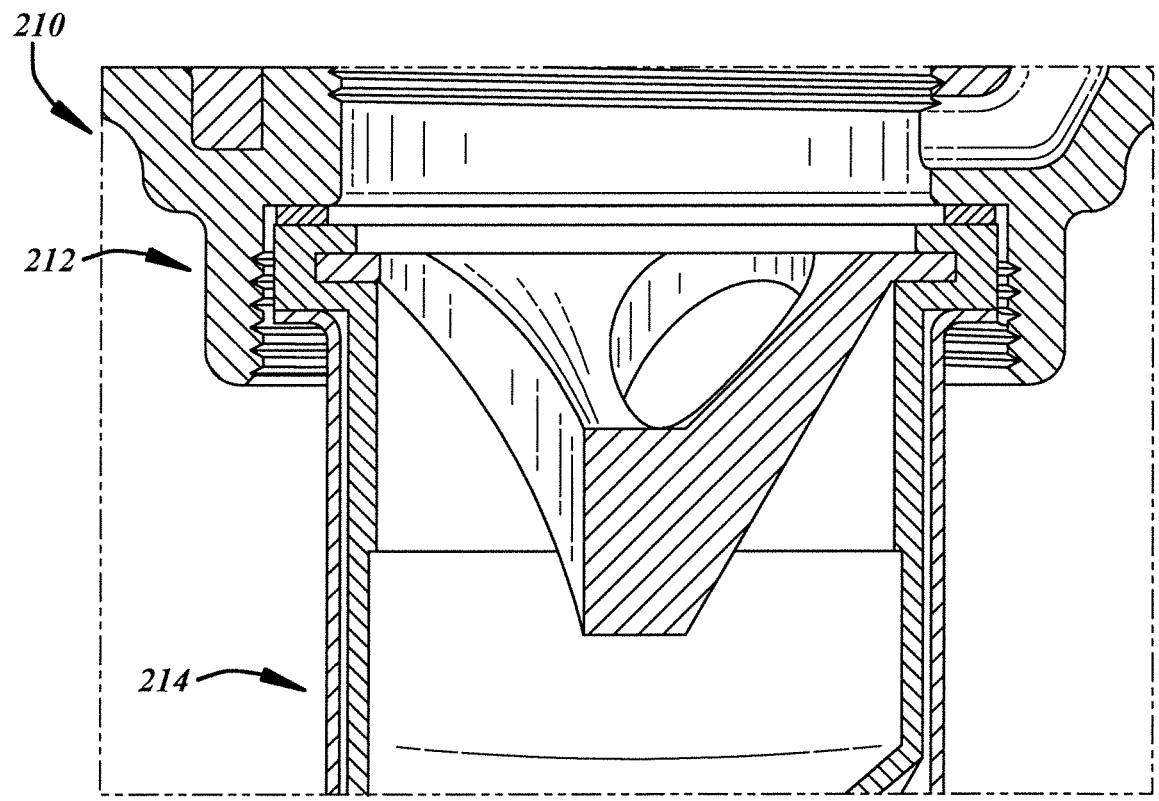
FIG. 14 is a fragmentary, cross-sectional view of the coupling of FIG. 13.

FIGS. 13 and 14 illustrate a flushometer valve assembly 210 including the flushometer valve body 212 of FIG. 11 and the outlet tube 214 of FIG. 12.

Figure 15:
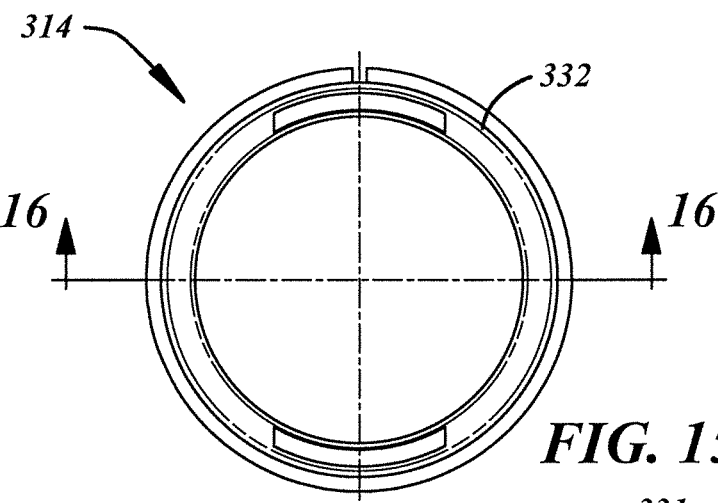
FIG. 15 is a top view of another illustrative embodiment of an outlet tube designed to thread directly to the flushometer valve body of FIG. 11.
Figure 16:
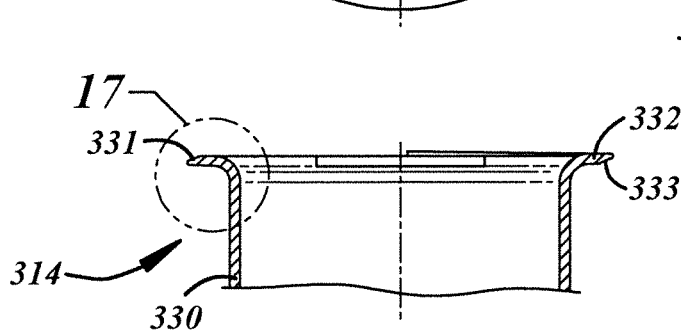
FIG. 16 is a sectional view of the outlet tube of FIG. 15.
Figure 17:
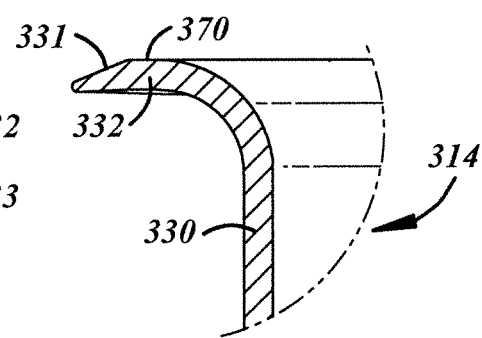
FIG. 17 is an enlarged, fragmentary, sectional view of the outlet tube of FIG. 15, taken from FIG. 16.

FIGS. 15-17 illustrate another illustrative embodiment of a flushometer outlet tube 314. This embodiment is similar in many respects to the embodiments of FIGS. 1-14 and like numerals between the embodiments generally designate like or corresponding elements throughout the several views of the drawing figures. Accordingly, the descriptions of the embodiments are hereby incorporated into one another, and description of subject matter common to the embodiments generally may not be repeated.

With reference to FIGS. 15-17, a radially outer portion of an outlet tube flange 332 is shaped in the form of an external thread for cooperation with the internal thread of the valve body outlet (not shown here). Notably, the outlet tube 314 does not have a conduit that is threaded, but, instead, includes the flange 332 that extends radially outwardly from a conduit 330 and that itself forms an external thread at a radially outer periphery thereof. As can be seen in FIG. 15, the flange 332 may be circumferentially interrupted to establish a thread start. As can be seen in FIG. 16, the threaded radially outer periphery of the flange 332 may include a downturned upper surface 331 at one side, and an upturned lower surface 333 at an opposite side. As can be seen in FIG. 17, the threaded radially outer periphery of the flange 332 may include a flat upper surface 370 and the downturned upper surface 331 may be disposed radially outward of the flat upper surface 370 with an angle from horizontal of about 19 degrees, or 0 to 45 degrees including all ranges, subranges, and values therebetween or, more specifically, 10 to 30 degrees including all ranges, subranges, and values therebetween.

Figure 18:
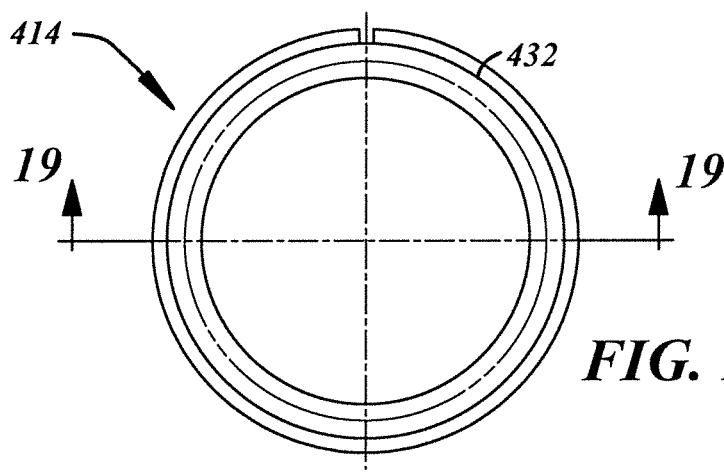
FIG. 18 is a top view of a further illustrative embodiment of an outlet tube designed to thread directly to the flushometer valve body of FIG. 11.
Figure 19:
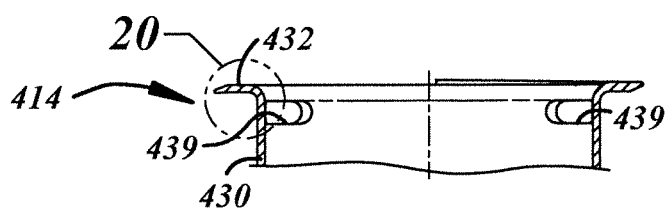
FIG. 19 is a sectional view of the outlet tube of FIG. 18.
Figure 20:
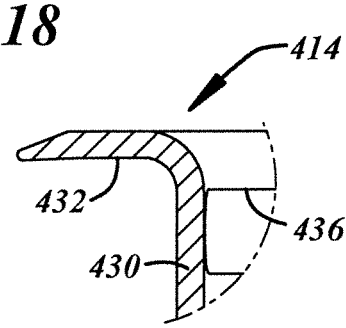
FIG. 20 is an enlarged, fragmentary, sectional view of the outlet tube of FIG. 18, taken from FIG. 19.

FIGS. 18-20 illustrate another illustrative embodiment of a flushometer outlet tube 414. This embodiment is similar in many respects to the embodiments of FIGS. 1-17 and like numerals between the embodiments generally designate like or corresponding elements throughout the several views of the drawing figures. Accordingly, the descriptions of the embodiments are hereby incorporated into one another, and description of subject matter common to the embodiments generally may not be repeated.

In particular, this embodiment is similar to that shown in FIGS. 15-17, except that the outlet tube 414 includes one or more vents 439 in a cylindrical conduit portion 430 below or axially spaced from a flange 432 of the outlet tube 414. In an example, there are two pairs of circumferentially elongate oval apertures provided in the outlet tube 430 to establish the vents 439.

A method of making a coupling for a flushometer valve body and outlet tube includes several steps. The flushometer valve body includes an outlet that is manufactured to include an outlet tube coupler, such as radially inwardly extending flanges and reliefs therein, or internal threads. The outlet tube is manufactured to include a conduit, a flange extending radially outwardly from the conduit, and a curvate portion therebetween. The outlet tube is also manufactured to include one or more vents therein in the cylindrical conduit portion near the flange or in the curvate portion. For vents in the curvate portion, the outlet tube may be manufactured to simultaneously form the vents and portions of the flange, for instance, straight lugs, helical lugs, and/or a flange thread. In assembly, the flange of the outlet tube is inserted into the outlet of the valve body and rotated relative thereto to couple the outlet tube to the body, and no coupling nut is required to couple the tube to the body. Also in assembly, one or more seals, vacuum breaker assembly, and/or the like may be interposed between the outlet tube and the body.

As used herein, the term "nut" includes an annular body that may have external wrench flats and an internal through passage and that may have a cylindrical portion that may be externally threaded. This is in contrast to a "bolt" that has a solid body that may have external wrench flats and threads. In any case, the presently disclosed flushometer valve assembly may include a flushometer valve body to outlet tube coupling that is nutless in that the coupling does not require a nut to couple the outlet tube to the flushometer valve body.

In general, the components of the apparatus can be manufactured according to molding, machining, stamping, bending, punching, flaring, threading, and other suitable manufacturing techniques. Likewise, any suitable materials can be used in making the components, such as metals (e.g., brass or stainless steel alloys), composites, polymeric materials, and the like.

Contrary to conventional wisdom in the art of flushometer valve assemblies, the presently disclosed method and apparatus omit use of a coupling nut to couple a flushometer valve body to an outlet tube, and vents in the outlet tube may be covered by a skirt of the flushometer valve body and not covered by a skirt of a coupling nut.

As used in this patent application, the terminology "for example," "for instance," "like," "such as," "comprising," "having," "including," and the like, when used with a listing of one or more elements, is open-ended, meaning that the listing does not exclude additional elements. Likewise, when preceding an element, the articles "a," "an," "the," and "said" mean that there are one or more of the elements. Moreover, directional words such as front, rear, top, bottom, upper, lower, radial, circumferential, axial, lateral, longitudinal, vertical, horizontal, transverse, and/or the like are employed by way of example and not limitation. Other terms are to be interpreted and construed in the broadest reasonable manner in accordance with their ordinary and customary meaning in the art, unless the terms are used in a context that requires a different interpretation.

Finally, the present disclosure is not a definitive presentation of an invention claimed in this patent application, but is merely a presentation of examples of illustrative embodiments of the claimed invention. More specifically, the present disclosure sets forth one or more examples that are not limitations on the scope of the claimed invention or on terminology used in the accompanying claims, except where terminology is expressly defined herein. And although the present disclosure sets forth a limited number of examples, many other examples may exist now or are yet to be discovered and, thus, it is neither intended nor possible to disclose all possible manifestations of the claimed invention. In fact, various equivalents will become apparent to artisans of ordinary skill in view of the present disclosure and will fall within the spirit and broad scope of the accompanying claims. Therefore, the claimed invention is not limited to the particular examples of illustrative embodiments disclosed herein but, instead, is defined by the accompanying claims.

The invention claimed is:

1. A flushometer valve assembly, comprising:
   a flushometer valve body including an outlet;
   an outlet tube including a conduit extending along a longitudinal axis; and
   a flushometer valve tube-to-body coupling that directly fastens the outlet tube to the flushometer valve body,
   wherein the outlet of the flushometer valve body includes an outlet tube coupler, and wherein the outlet tube also includes a flange extending radially outwardly with respect to the conduit,
   wherein the flushometer valve tube-to-body coupling includes at least two lugs circumferentially spaced apart on the outlet tube flange for direct coupling to the outlet tube coupler of the flushometer valve body,
   wherein the outlet tube coupler includes at least one internal thread, and radially outer portions of the at least two lugs are helically shaped for cooperation with the at least one internal thread.

2. The assembly of claim 1, wherein the outlet tube includes
   a transition portion between the conduit and the flange and including one or more vents therein.

3. The assembly of claim 2, wherein the transition portion is curvate.

4. The assembly of claim 1, wherein the outlet tube coupler includes at least two flanges circumferentially spaced apart by at least two corresponding lug reliefs.

5. The assembly of claim 1 excluding a nut coupling the outlet tub to the flushometer valve body.

6. The assembly of claim 1 wherein the valve body is of one-piece integral construction.

7. The assembly of claim 1 wherein the outlet tube is of one-piece integral construction.

8. A flushometer valve assembly, comprising:
a flushometer valve body including an outlet;
an outlet tube including a conduit extending along a longitudinal axis; and
a flushometer valve tube-to-body coupling that directly fastens the outlet tube to the flushometer valve body,
wherein the outlet of the flushometer valve body includes an outlet tube coupler, and wherein the outlet tube also includes a flange extending radially outwardly with respect to the conduit,
wherein the flushometer valve tube-to-body coupling includes at least two lugs circumferentially spaced apart on the outlet tube flange for direct coupling to the outlet tube coupler of the flushometer valve body,
wherein at least one of the at least two flanges includes a lug detent and at least one of the at least two lugs includes a corresponding flange detent for cooperating with the lug detent to circumferentially locate the outlet tube relative to the flushometer valve body.

9. The assembly of claim 8, wherein the outlet tube includes a radiused transition portion between the conduit and the flange and having at least one vent slot therein.

10. The assembly of claim 8, further comprising a vacuum breaker sleeve carried by the outlet tube and having a conduit carried in the conduit of the outlet tube, and having an enlarged head portion carried between the flange of the outlet tube and the body.

11. A flushometer valve assembly, comprising:
a flushometer valve body of one-piece integral construction and including an outlet and an outlet tube coupler including at least two flanges circumferentially spaced apart by at least two corresponding lug reliefs;
an outlet tube of one-piece integral construction and including a conduit extending along a longitudinal axis and wherein the outlet tube also includes a flange extending radially outwardly with respect to the conduit; and
a flushometer valve tube-to-body coupling that excludes a nut coupling the outlet tube to the flushometer valve body and includes at least two lugs circumferentially spaced apart on the outlet tube flange for direct coupling to the outlet tube coupler of the flushometer valve body,
wherein at least one of the at least two flanges includes a lug detent and at least one of the at least two lugs includes a corresponding flange detent for cooperating with the lug detent to circumferentially locate the outlet tube relative to the flushometer valve body.

12. A flushometer valve assembly, comprising:
a flushometer valve body of one-piece integral construction and including an outlet and an outlet tube coupler including at least one internal thread;
an outlet tube of one-piece integral construction and including a conduit extending along a longitudinal axis; and
a flushometer valve tube-to-body coupling that excludes a nut coupling the outlet tube to the flushometer valve body and includes a flange of the outlet tube threaded to the at least one internal thread of the flushometer valve body,
wherein radially outer portions of at least two lugs of the outlet tube are helically shaped for cooperation with the at least one internal thread.

13. The assembly of claim 12, wherein the outlet tube includes
a transition portion between the conduit and the flange and including one or more vents therein.

14. The flushometer valve outlet tube of claim 13, wherein the transition portion is curvate.

15. A flushometer valve assembly, comprising:
a flushometer valve body including an outlet;
an outlet tube including a conduit extending along a longitudinal axis; and
a flushometer valve tube-to-body coupling that directly fastens the outlet tube to the flushometer valve body,
wherein the outlet of the flushometer valve body includes an outlet tube coupler, and wherein the outlet tube also includes a flange extending radially outwardly with respect to the conduit,
wherein the outlet tube coupler includes at least one internal thread, and a radially outer periphery of the flange is in the form of an external thread configured to be threaded to the at least one internal thread of the outlet tube coupler,
wherein the flange includes a flat upper surface, a downturned upper surface disposed radially outwardly of the flat upper surface, and an upturned lower surface.

16. The assembly of claim 15 wherein the outlet tube includes curvate transition portion between the conduit and the flange and having at least one vent slc therein.

17. The assembly of claim 15 wherein the conduit has at least on vent slot therein.

18. The flushometer valve assembly of claim 15, wherein the flange is circumferentially interrupted to establish a thread start of the flange.

19. A flushometer valve assembly, comprising:
a flushometer valve body of one-piece integral construction and including an outlet and an outlet tube coupler including at least one internal thread;
an outlet tube of one-piece integral construction and including a conduit extending along a longitudinal axis; and
a flushometer valve tube-to-body coupling that excludes a nut coupling the outlet tube to the flushometer valve body and includes a flange of the outlet tube having a radially outer periphery in the form of an external thread configured to be threaded to the at least one internal thread of the flushometer valve body,
wherein the flange includes a flat upper surface, a downturned upper surface disposed radially outwardly of the flat upper surface, and an upturned lower surface.

20. The flushometer valve assembly of claim 19, wherein the flange is circumferentially interrupted to establish a thread start of the flange.

* * * * *